US012800998B2

(12) United States Patent
Wang et al.

(10) Patent No.: US 12,800,998 B2
(45) Date of Patent: Nov. 17, 2026

(54) IMAGE CAPTURING DEVICE

(71) Applicant: Chicony Electronics Co., Ltd., New Taipei City (TW)

(72) Inventors: Kuan Wen Wang, New Taipei City (TW); Pei-Sheng Tsai, New Taipei City (TW)

(73) Assignee: Chicony Electronics Co., Ltd., New Taipei City (TW)

( * ) Notice: Subject to any disclaimer, the term of this patent is extended or adjusted under 35 U.S.C. 154(b) by 240 days.

(21) Appl. No.: 18/733,818

(22) Filed: Jun. 4, 2024

(65) Prior Publication Data

US 2025/0237933 A1 Jul. 24, 2025

(30) Foreign Application Priority Data

Jan. 19, 2024 (TW) ................................ 113102164

(51) Int. Cl.
*G03B 17/56* (2021.01)

(52) U.S. Cl.
CPC .................................. *G03B 17/561* (2013.01)

(58) Field of Classification Search
CPC .. B60R 11/04; B60R 2011/0026; F16M 11/10
See application file for complete search history.

(56) References Cited

U.S. PATENT DOCUMENTS

| | | | | |
|---|---|---|---|---|
| 8,379,089 B2 * | 2/2013 | Lee | H04N 23/50 348/151 |
| 11,692,667 B2 * | 7/2023 | Zhou | F16M 11/18 248/371 |
| 12,480,615 B2 * | 11/2025 | Barbo | F16M 11/126 |
| 2022/0086312 A1 * | 3/2022 | Kim | F16M 11/10 |

FOREIGN PATENT DOCUMENTS

| | | | | |
|---|---|---|---|---|
| CN | 114789699 A * | 7/2022 | B60R 11/04 |
| CN | 115071594 A * | 9/2022 | B60R 11/04 |
| CN | 217508851 U * | 9/2022 | |
| KR | 20220145537 A * | 10/2022 | G03B 17/561 |
| TW | M418311 | 12/2011 | |

OTHER PUBLICATIONS

"Office Action of Taiwan Counterpart Application", issued on Jul. 15, 2024, p. 1-p. 7.

* cited by examiner

*Primary Examiner* — Leon W Rhodes, Jr.
(74) *Attorney, Agent, or Firm* — JCIPRNET

(57) ABSTRACT

An image capturing device includes a housing, an image capturing module, a driven part and an angle-adjusting unit. The image capturing module is rotatably disposed on the housing along a first rotating axis. The driven part is connected to the image capturing module. The angle-adjusting unit is rotatably disposed on the housing along a second rotating axis and engaged to the driven part, wherein the angle-adjusting unit is adapted to rotate along the second rotating axis to drive the image capturing module to rotate along the first rotating axis by the driven part.

12 Claims, 7 Drawing Sheets

IMAGE CAPTURING DEVICE

CROSS-REFERENCE TO RELATED APPLICATION

This application claims the priority benefit of Taiwan application serial no. 113102164, filed on Jan. 19, 2024. The entirety of the above-mentioned patent application is hereby incorporated by reference herein and made a part of this specification.

BACKGROUND

Technical Field

The disclosure relates to an image capturing device, and in particular to an image capturing device that can fine tune an angle of an image capturing module.

Description of Related Art

Generally speaking, in order to adapt to different scenarios or usage needs, the lenses of video products such as monitors or driving recorders require the function of adjusting the angle. However, the lens angle adjustment mechanisms of video products currently on the market are relatively complex, and is difficult to fine tune the lens angle. Therefore, how to fine tune the lens angle of the video products in a simple manner is an issue being discussed in this field.

SUMMARY

The disclosure provides an image capturing device, which can fine tune the angle of the image capturing module and has the effects of saving efforts and convenience of operation.

An image capturing device of the disclosure includes a housing, an image capturing module, a driven part, and an angle-adjusting unit. The image capturing module is rotatably disposed on the housing along a first rotating axis. The driven part is connected to the image capturing module. The angle-adjusting unit is rotatably disposed on the housing along a second rotating axis and engaged to the driven part. The angle-adjusting unit is adapted to rotate along the second rotating axis to drive the image capturing module to rotate along the first rotating axis by the driven part.

In an embodiment of the disclosure, the first rotating axis is perpendicular to the second rotating axis.

In an embodiment of the disclosure, the first rotating axis is perpendicular to an optical axis of the image capturing module.

In an embodiment of the disclosure, the housing has a mounting surface. The image capturing device is adapted to be installed on a windshield of a vehicle by the mounting surface. The second rotation axis is tilted on the mounting surface.

In an embodiment of the disclosure, the image capturing module faces the front of the image capturing device. The angle-adjusting unit has a force-receiving part. The force-receiving part faces the rear of the image capturing device. The force-receiving part is adapted to receive the force to rotate the angle-adjusting unit along the second rotating axis.

In an embodiment of the disclosure, the force-receiving part includes a non-circular hole.

In an embodiment of the disclosure, the angle-adjusting unit further has a flight portion and an extension part. The flight portion is engaged to the driven part, and the extension part is connected between the flight portion and the force-receiving part.

In an embodiment of the disclosure, the angle-adjusting unit further has at least one structural reinforcing rib. The at least one structural reinforcing rib is connected to the extension part.

In an embodiment of the disclosure, the image capturing module includes a lens and a base. The lens is disposed on the base. The base has a driven part mounting part. The driven part is connected to the driven part mounting part.

In an embodiment of the disclosure, the housing includes a first housing part and a second housing part. The base is rotatably disposed between the first housing part and the second housing part.

In an embodiment of the disclosure, the image capturing device further includes a decoration cover. The decoration cover is connected to the image capturing module, thereby rotating along with the image capturing module. The decorative cover has a direction indicating mark. The direction indicating mark is used to indicate a direction of the optical axis of the image capturing module.

In an embodiment of the disclosure, when the angle-adjusting unit rotates one turn along the second rotating axis, the rotation range of the driven part along the first rotating axis is less than one turn.

In an embodiment of the disclosure, the housing has at least one stopper. The driven part has at least another stopper. The at least one stopper and the at least another stopper are adapted to stop each other to limit the rotation angle range of the image capturing module relative to the housing.

Based on the above, in the image capturing device of the disclosure, the image capturing module is connected to the angle-adjusting unit through the driven part. The user may rotate the angle-adjusting unit to drive the image capturing module to rotate by the driven part, thereby adjusting the angle of the image capturing module. Since the image capturing device is not directly rotated by the user to adjust the angle, but through the linkage of the angle-adjusting unit and the driven part to adjust the angle as mentioned above, so that the deceleration effect during the linking of the angle-adjusting unit 140 and the driven part 130 may be used to achieve the effect of fine tuning the angle and saving efforts.

DESCRIPTION OF THE EMBODIMENTS

Figure 1:
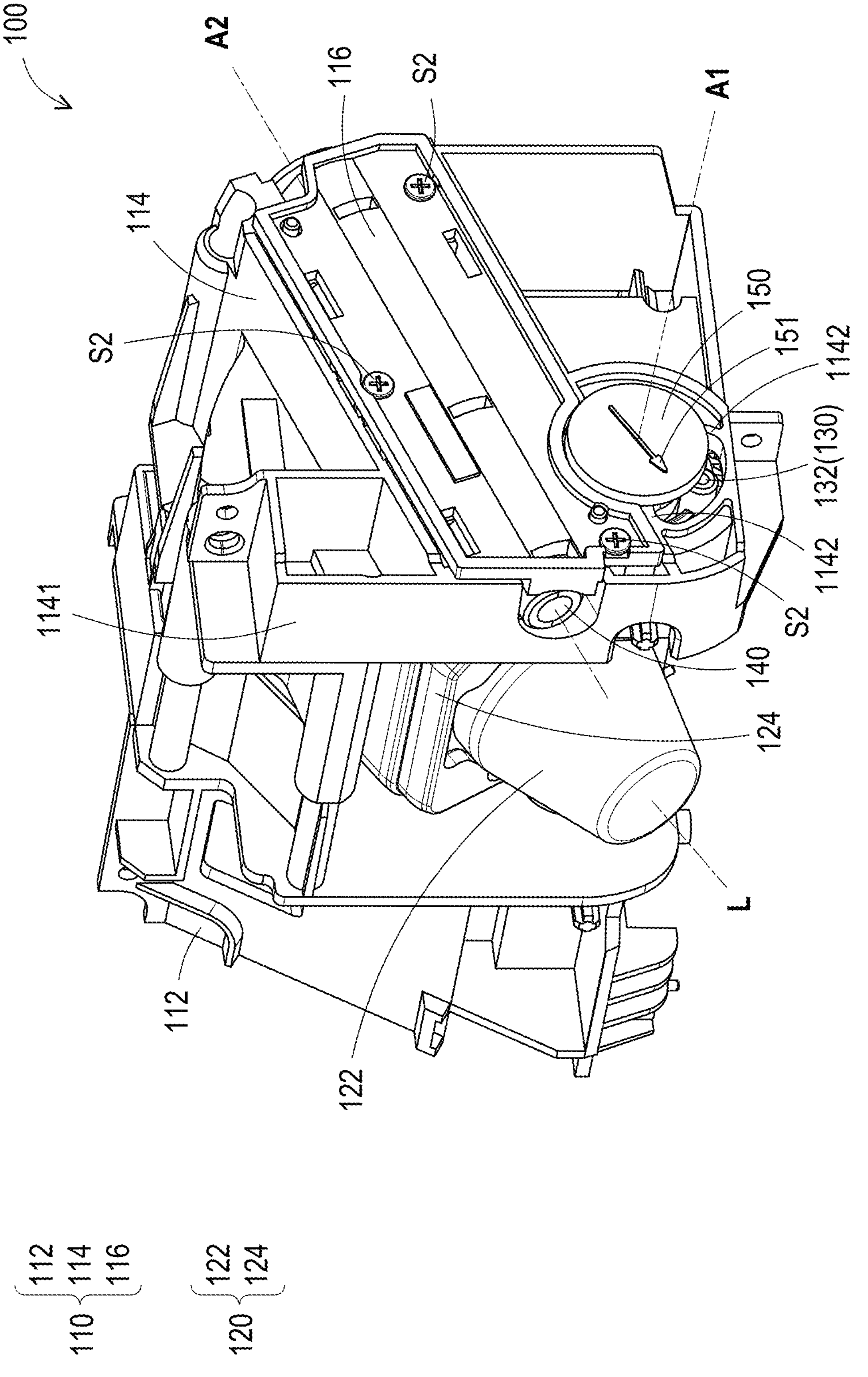
FIG. 1 is a perspective view of an image capturing device according to an embodiment of the disclosure.

For the convenience and clarity of explanation, the thickness or size of each component in the drawings is exaggerated, omitted, or schematically expressed to facilitate the understanding and reading of those familiar with this art. The size of each component is not completely the actual size thereof and is not used to limit the implementation of the disclosure, which has no technical substantive significance. Under the premise of not affecting the efficacy and the purpose of the disclosure, any structural modifications, changes in proportions, or adjustments in size should still fall within the scope of the technical content disclosed in the disclosure. The same reference numbers will be used throughout the drawings to refer to the same or similar elements.

Figure 2:
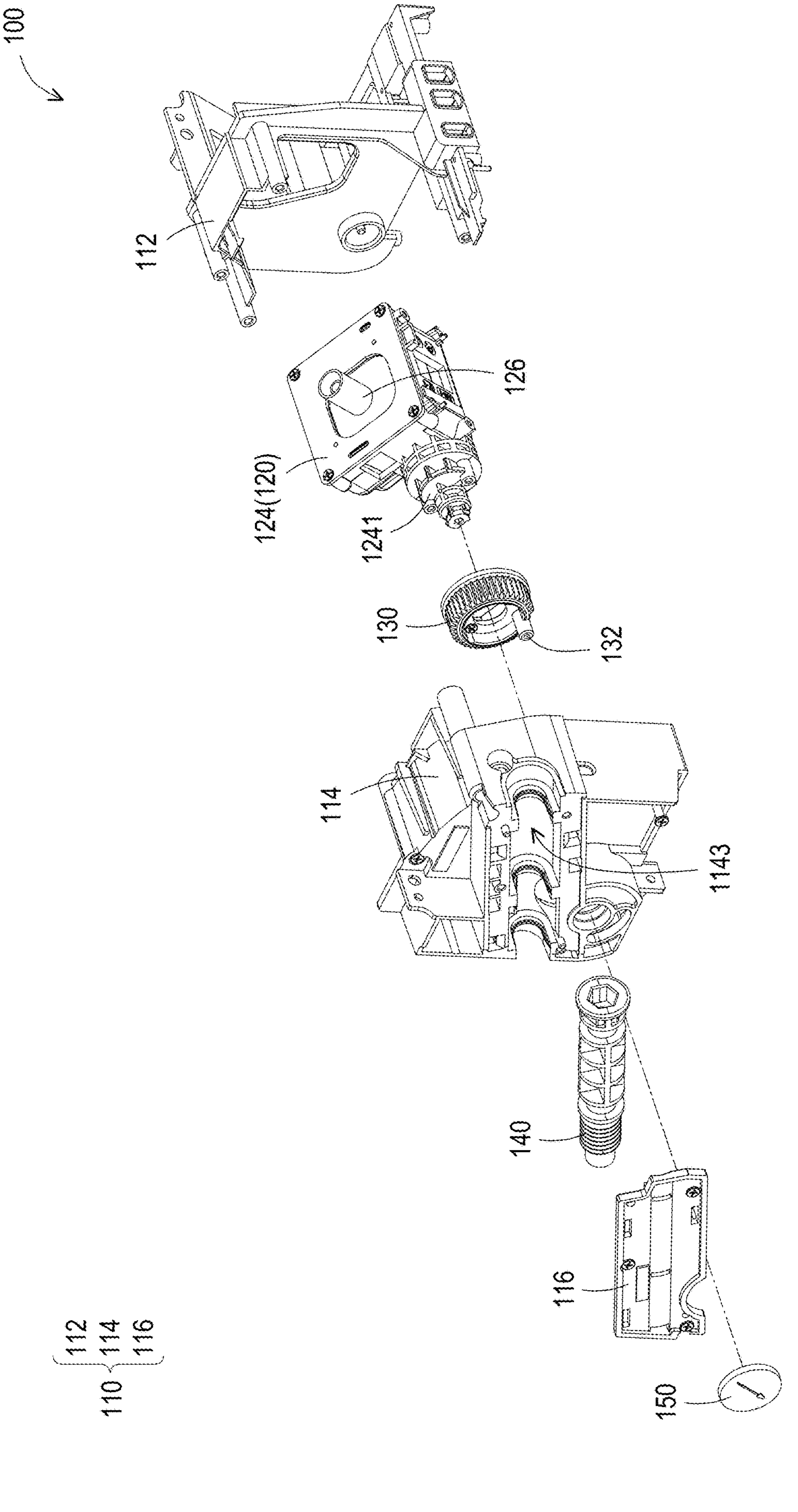
FIG. 2 is an exploded view of the image capturing device in FIG. 1.
Figure 3:
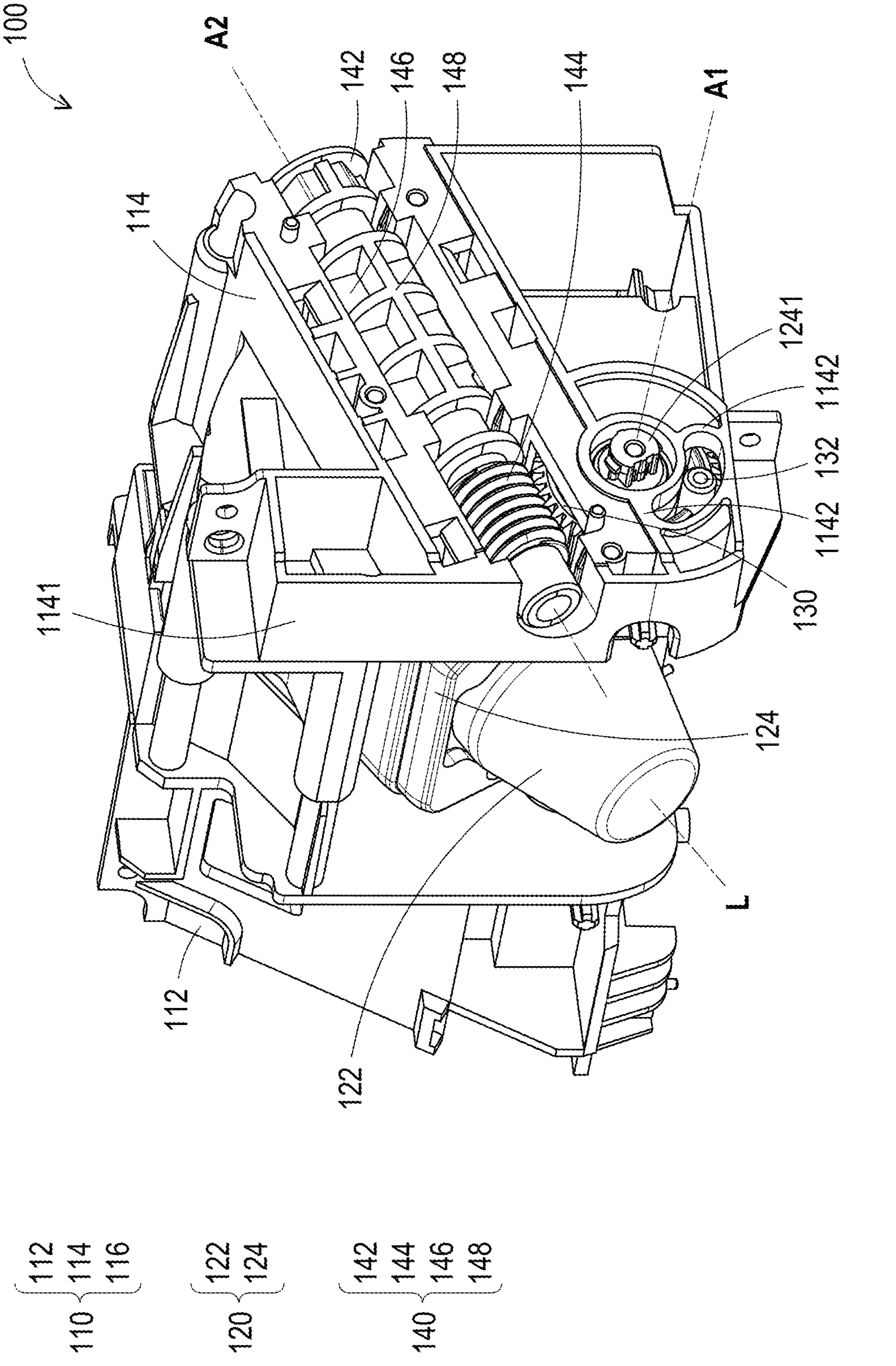
FIG. 3 is a perspective view of some components of the image capturing device in FIG. 1.

FIG. 1 is a perspective view of an image capturing device according to an embodiment of the disclosure. FIG. 2 is an exploded view of the image capturing device in FIG. 1. FIG. 3 is a perspective view of some components of the image capturing device in FIG. 1. Referring to FIGS. 1 to 3, an image capturing device 100 of this embodiment is, for example, a driving recorder or a monitor. The image capturing device 100 includes a housing 110, an image capturing module 120, a driven part 130, and an angle-adjusting unit 140. The image capturing module 120 is rotatably disposed on the housing 110 along a first rotating axis A1. The driven part 130 is connected to the image capturing module 120. The angle-adjusting unit 140 is rotatably disposed on the housing 110 along a second rotating axis A2 and engaged to the driven part 130. The angle-adjusting unit 140 is adapted to rotate along the second rotating axis A2 to drive the image capturing module 120 to rotate along the first rotating axis A1 by the driven part 130.

As mentioned above, in the image capturing device 100 of this embodiment, the image capturing module 120 is connected to the angle-adjusting unit 140 through the driven part 130, and the user may rotate the angle-adjusting unit 140 to drive the image capturing module 120 to rotate by the driven part 130, thereby adjusting the angle of the image capturing module 120. Since the image capturing device 100 is not directly rotated by the user to adjust the angle, but through the linkage of the angle-adjusting unit 140 and the driven part 130 to adjust the angle as mentioned above, so that a deceleration effect during the linking of the angle-adjusting unit 140 and the driven part 130 may be used to achieve the effect of fine tuning the angle and saving efforts. In addition, instead of using complex and costly hinges to achieve the purpose of rotating the image capturing module, this embodiment uses the angle-adjusting unit 140 and the driven part 130 to drive the image capturing module 120 to rotate, which can reduce costs and the complexity of assembly.

In this embodiment, the driven member 130 is, for example, a gear, and the angle-adjusting unit 140 is, for example, a screw. However, the disclosure is not limited thereto. In other embodiments, the image capturing device may also adjust the angle of the image capturing module through bevel gears or multi-links.

Specifically, the deceleration effect may be achieved by setting a gear ratio of the angle-adjusting unit 140 and the driven part 130. The setting of the gear ratio of the screw and the gear and the corresponding deceleration and effort-saving principles are known in the technical field, which are not repeated herein. For example, by setting the gear ratio between the angle-adjusting unit 140 and the driven part 130, when the user rotates the angle-adjusting unit 140 one turn along the second rotating axis A2, a rotation range of the driven part 130 along the first rotating axis A2 is less than one turn to achieve the deceleration effect. In this embodiment, when the angle-adjusting unit 140 rotates one turn, the driven part 130 rotates, for example, one-fortieth turn. That is to say, when the angle-adjusting unit 140 rotates 360 degrees, the driven part 130 rotates 9 degrees, but the disclosure is not limited thereto. The user may adjust the gear ratio and a tooth shape of the driven part 130 and the angle-adjusting unit 140 according to operation requirements of a lens rotation.

As shown in FIG. 1, an extension direction of the first rotating axis A1 may be different from an extension direction of the second rotating axis A2. In this embodiment, the first rotating axis A1 is perpendicular to the second rotating axis A2. The first rotating axis A1 is perpendicular to an optical axis L of the image capturing module 120. However, the relative relationship between the first rotating axis A1, the second rotating axis A2, and the optical axis L is not limited thereto.

A structure of the image capturing device 100 is described in detail below.

Referring to FIGS. 1 to 3, the housing 110 includes a first housing part 112, a second housing part 114, and a fixed cover 116. The first housing part 112 is connected to the second housing part 114. The fixed cover 116 is disposed on the second housing part 114. The image capturing module 120 includes a lens 122, a base 124, and a connector 126. The lens 122 is disposed on the base 124. The base 124 is rotatably disposed between the first housing part 112 and the second housing part 114 and has a driven part mounting part 1241. The connector 126 faces the rear of the image capturing device 100 and is electrically connected to a transmission line (not shown). The driven part 130 is connected to the driven part mounting part 1241 of the image capturing module 120. A flight portion 144 of the angle-adjusting unit 140 is engaged to the driven part 130. A decoration cover 150 is disposed on the driven part mounting part 1241.

In this embodiment, the image capturing device 100 disposes the lens 122 and the connector 126 on the base 124, and then is rotatably disposed on the housing 110 through the base 124, so that the image capturing device 100 may have better compatibility for different types of the lens 122 and the connector 126.

In this embodiment, in the image capturing device 100, the decoration cover 150 is connected to the driven part mounting part 1241 of the image capturing module 120, thereby rotating along with the image capturing module 120. The decoration cover 150 has a direction indicating mark 151. The direction indicating mark 151 is used to indicate a direction of the optical axis L of the image capturing module 120. That is to say, the user may directly confirm the direction of the optical axis L of the image capturing module 120 through the decoration cover 150, thereby improving a convenience of operation of the user.

Figure 4:
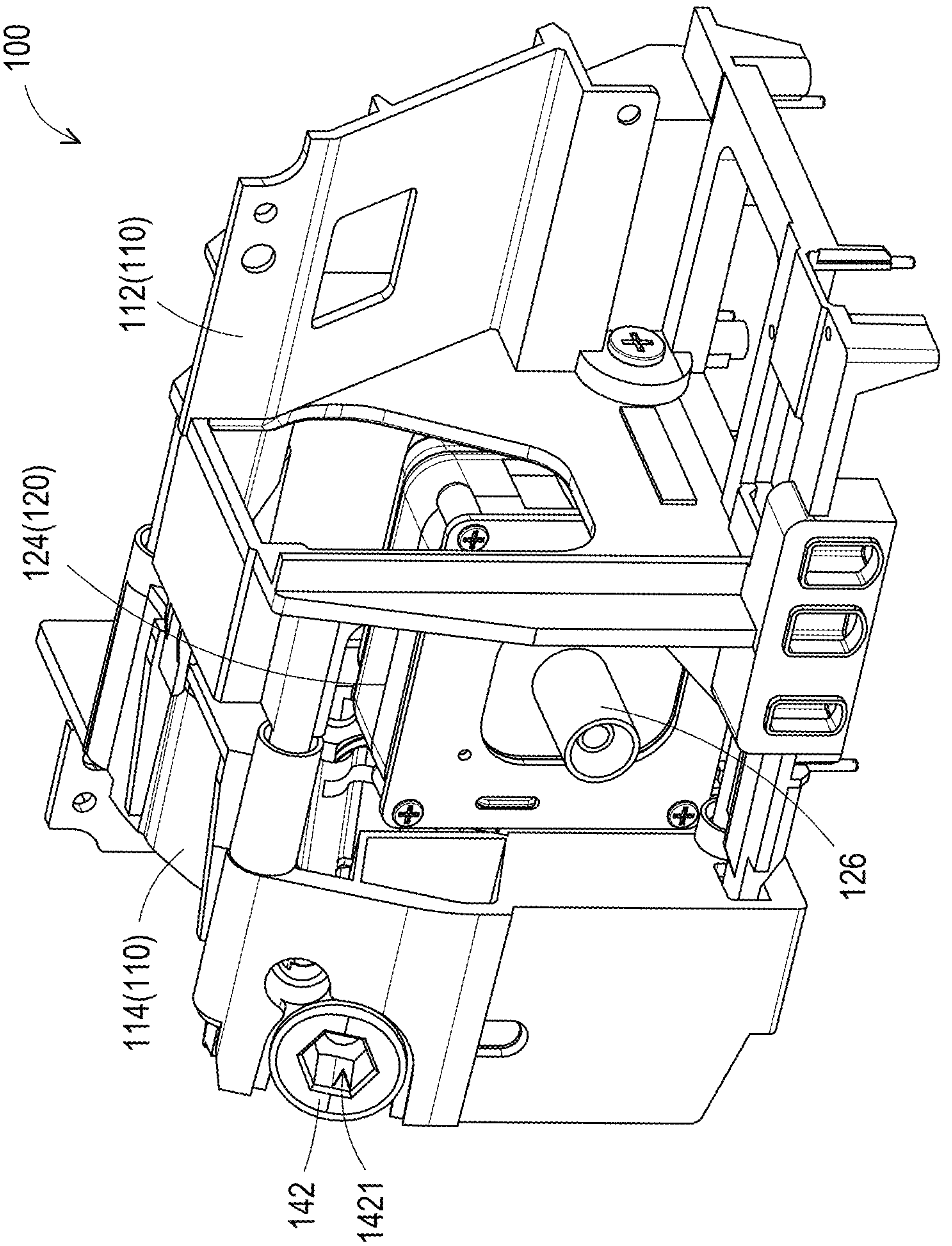
FIG. 4 is a perspective view of the image capturing device of FIG. 1 from another perspective.
Figure 5:
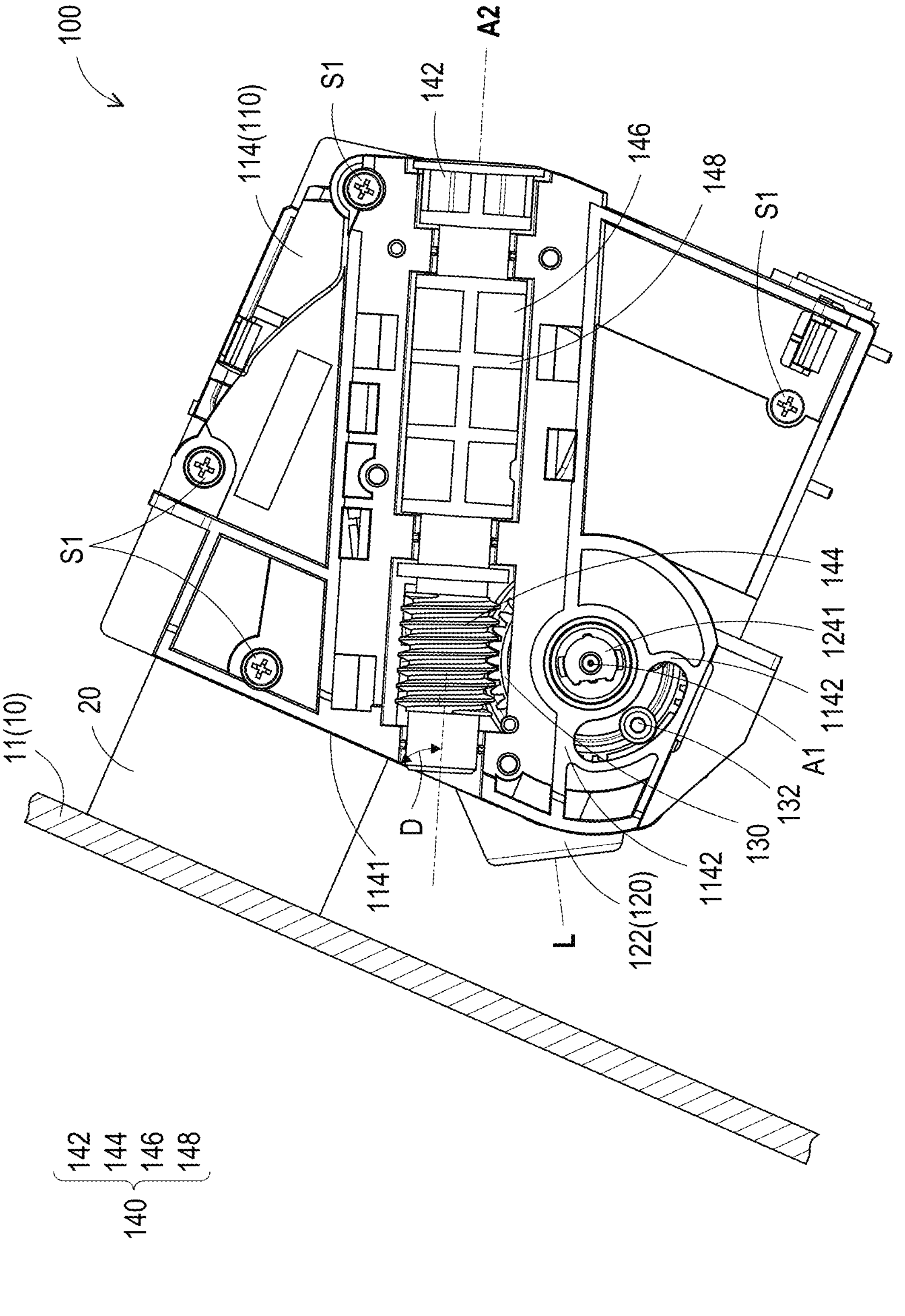
FIG. 5 is a schematic diagram of the image capturing device of FIG. 3 installed on a windshield.

FIG. 4 is a perspective view of the image capturing device of FIG. 1 from another perspective. Referring to FIG. 3 and FIG. 4, the angle-adjusting unit 140 further has a force-receiving part 142 and an extension part 146. The extension part 146 is connected between the flight portion 144 and the force-receiving part 142. In this embodiment, the lens 122 of the image capturing module 120 faces the front of the image capturing device 100 as shown in FIG. 1. The force-receiving part 142 faces the rear of the image capturing device 100 as shown in FIG. 5. The force-receiving part 142 is adapted to receive force to rotate the angle-adjusting unit 140 along the second rotating axis A2. That is to say, since the flight portion 144 of the angle-adjusting unit 140 is engaged to the driven part 130, when the force-receiving part 142 of the angle-adjusting unit 140 receives force to rotate the angle-adjusting unit 140 along the second rotating axis A2, the driven part 130 is driven by the flight portion 144 to rotate along the first rotating axis A1, thereby driving the image capturing module 120 to also rotate along the first rotating axis A1. In this embodiment, the extension part 146 is disposed between the flight portion 144 and the force-receiving part 142 so that the lens 122 of the image capturing module 120 and the force-receiving part 142 of the angle-adjusting unit 140 may be located on the opposite sides of the image capturing device 100, thereby making the force-receiving part 142 face the user to improve the convenience of operation of the user.

Referring to FIG. 4, the force-receiving part 142 includes a non-circular hole 1421. In this embodiment, the non-circular hole 1421 is a hexagonal hole, and the user may rotate the angle-adjusting unit 140 through a hex wrench to improve the convenience of operation of the user. Furthermore, the user may achieve the purpose of rotating the image capturing module 120 through common tools. However, the disclosure does not limit the shape of the non-circular hole 1421. In addition, compared with a design in which the force-receiving part is a convex structure, this embodiment allows the image capturing device 100 to have a better overall size and appearance.

Referring to FIG. 3, the angle-adjusting unit 140 further has multiple structural reinforcing ribs 148 connected to the extension part 146 to enhance an overall structural strength of the angle-adjusting unit 140.

FIG. 5 is a schematic diagram of the image capturing device of FIG. 3 installed on a windshield. Referring to FIGS. 3 and 5, the second housing part 114 of the housing 110 of this embodiment has a mounting surface 1141. The image capturing device 100 is adapted to be installed on a windshield 11 of a vehicle 10 through the mounting surface 1141 and a mounting member 20. The second rotating axis A2 is tilted on the mounting surface 1141. Accordingly, when the image capturing device 100 is installed on the windshield 11, the second rotating axis A2 rotates along with the angle of the windshield 11 to be close to horizontal, so that the force-receiving part 142 may face the user, thereby improving the convenience of operation of the user. In this embodiment, the image capturing device 100 fixes the mounting surface 1141 on the mounting member 20 by, for example, adhering, but the disclosure does not limit the fixing method of the image capturing device 100. In this embodiment, the mounting member 20 is schematically shown, and the mounting member 20 is fixed to the windshield 11 through, for example, a suction cup or a back adhesive. In this embodiment, an angle D (as shown in FIG. 5) between the second rotating axis A2 and the mounting surface 1141 is 70 degrees, but the disclosure does not limit the angle of the angle D.

Figure 6:
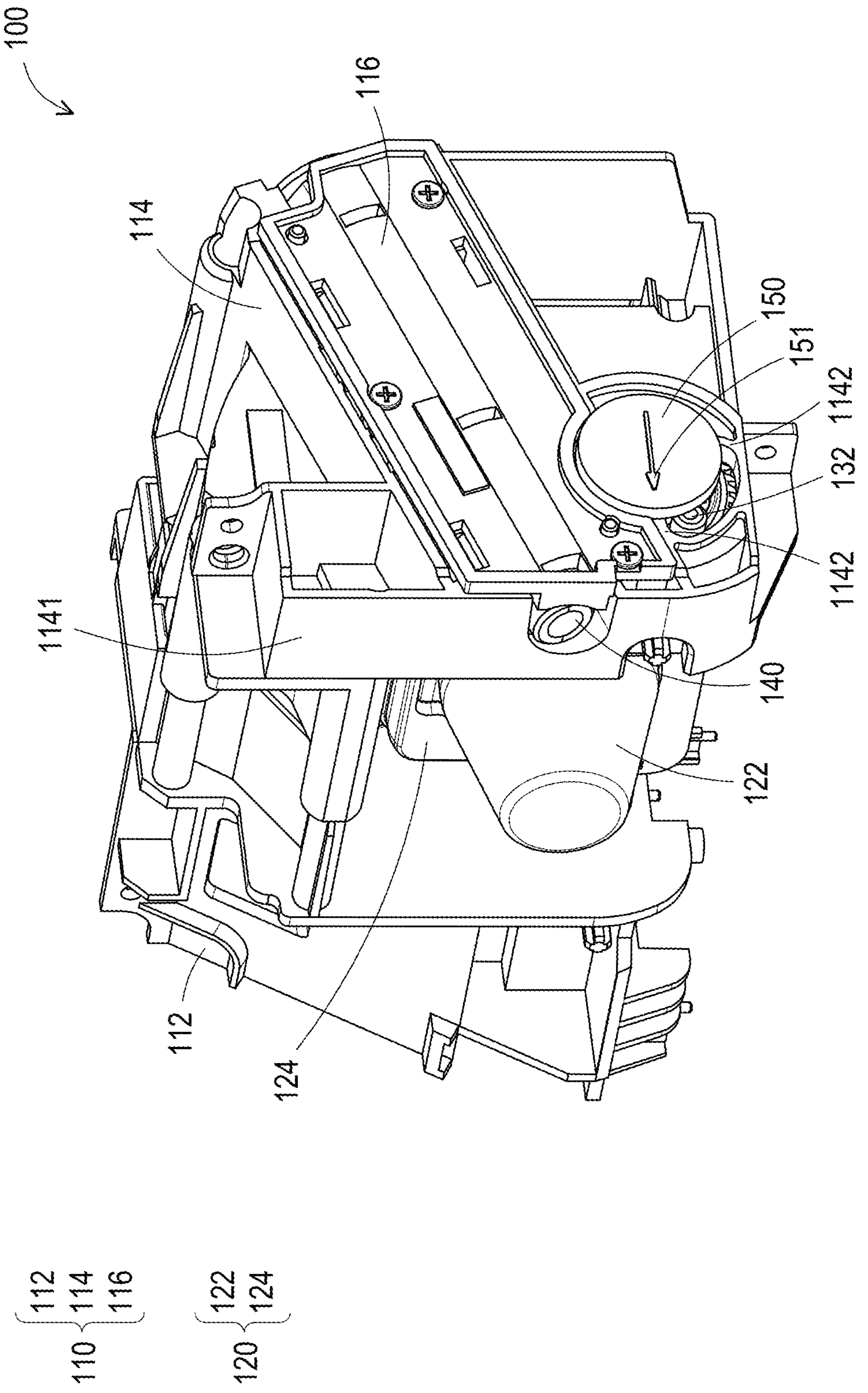
FIG. 6 illustrates the image capturing module of FIG. 1 rotating clockwise.
Figure 7:
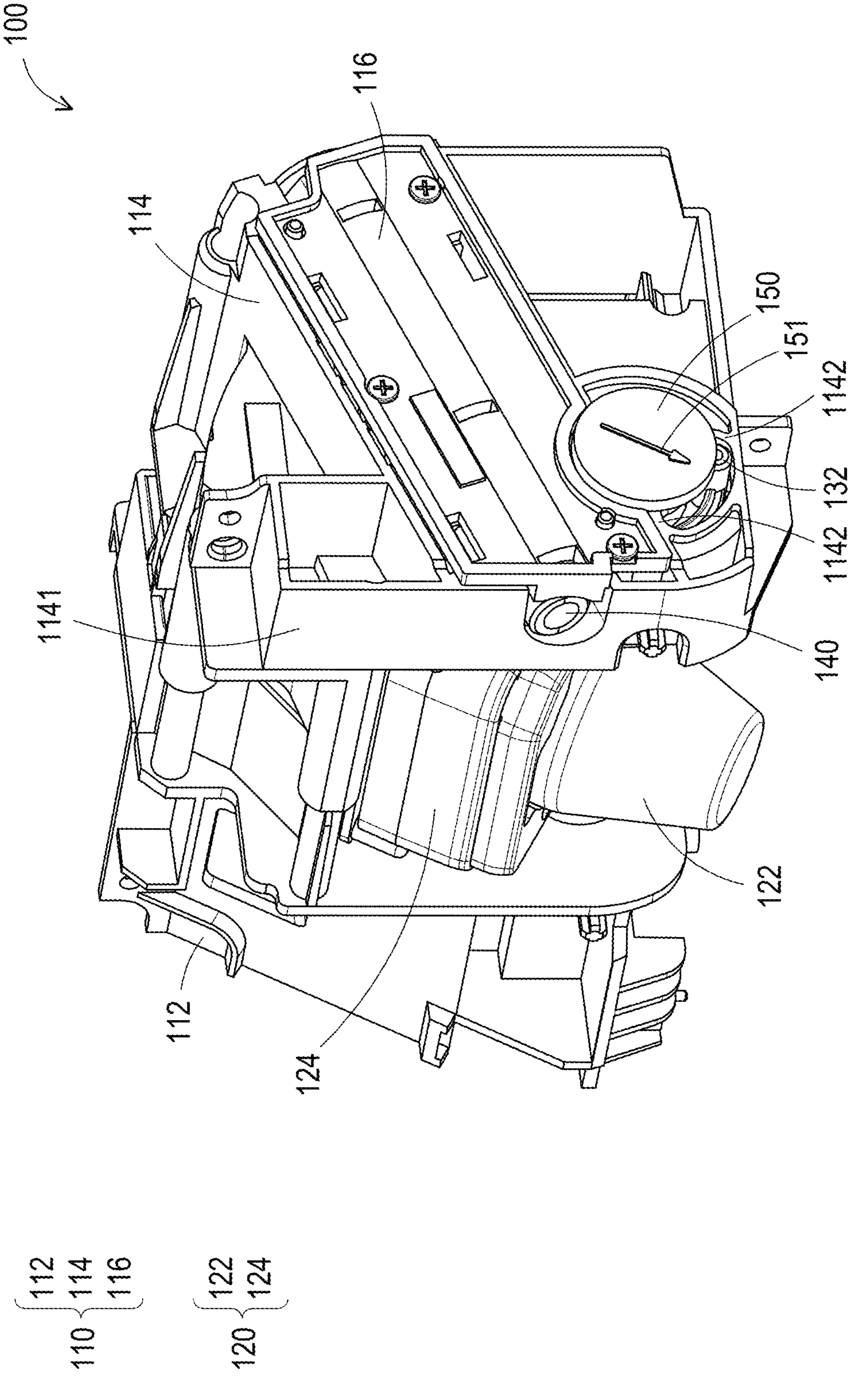
FIG. 7 illustrates the image capturing module of FIG. 1 rotating counterclockwise.

FIG. 6 illustrates the image capturing module of FIG. 1 rotating clockwise. FIG. 7 illustrates the image capturing module of FIG. 1 rotating counterclockwise. Referring to FIGS. 6 and 7, the second housing part 114 of the housing 110 has a stopper 1142, and the driven part 130 has a stopper 132. The stopper 132 and the stopper 1142 are adapted to stop each other to limit the rotation angle range of the image capturing module 120 relative to the housing 110. In this embodiment, when the image capturing module 120 rotates from one limit state as shown in FIG. 6 to another limit state as shown in FIG. 7, the rotation angle of the image capturing module 120 is 75 degrees. However, the disclosure does not limit the rotational angle range of the image capturing module 120.

The following describes an assembly manner of the image capturing device 100 of this embodiment.

Referring to FIG. 1 and FIG. 3, first, the driven part 130 is connected to the driven part mounting part 1241 of the image capturing module 120. Then, one side of the image capturing module 120 having the driven part mounting part 1241 is disposed on the second housing part 114 of the housing 110, and another side of the image capturing module 120 is disposed on the first housing part 112 of the housing 110. The first housing part 112 and the second housing part 114 are then fastened to each other through a fastener S1 (shown in FIG. 5), so that the image capturing module 120 is confined between the first housing part 112 and the second housing part 114. Next, the angle-adjusting unit 140 is placed into a long slot 1143 (shown in FIG. 2) of the second housing part 114, and the fixed cover 116 of the housing 110 is disposed on the second housing part 114 through a fastener S2 (shown in FIG. 1), so that the angle-adjusting unit 140 is confined between the long slot 1143 of the second housing part 114 and the fixed cover 116. Finally, the decoration cover 150 is installed on the driven part mounting part 1241 to complete the assembly. In this embodiment, the fasteners S1 and S2 are screws, for example, but the disclosure is not limited thereto.

To sum up, in the image capturing device of the disclosure, the image capturing module is connected to the angle-adjusting unit through the driven part, and the user may rotate the angle-adjusting unit to drive the image capturing module to rotate by the driven part, thereby adjusting the angle of the image capturing module. Since the image capturing device is not directly rotated by the user to adjust the angle, but through the linkage of the angle-adjusting unit and the driven part to adjust the angle as mentioned above, the deceleration effect during the linking of the angle-adjusting unit 140 and the driven part 130 may be used to achieve the effect of fine tuning the angle and saving efforts.

Although the invention has been described with reference to the above embodiments, it will be apparent to one of ordinary skill in the art that modifications to the described embodiments may be made without departing from the spirit of the invention, and the invention covers modifications and variations provided. Therefore, the scope of the invention is defined by the attached claims not by the above detailed descriptions.

What is claimed is:

1. An image capturing device, comprising:

a housing;

an image capturing module, rotatably disposed on the housing along a first rotating axis;

a driven part, connected to the image capturing module; and an angle-adjusting unit, rotatably disposed on the housing along a second rotating axis and engaged to the driven part, wherein the angle-adjusting unit is adapted to rotate along the second rotating axis to drive the image capturing module to rotate along the first rotating axis by the driven part, wherein the angle-adjusting unit has a flight portion, and the driven part is a gear, the flight portion is meshed with the gear to form a deceleration transmission mechanism, wherein in response to the angle-adjusting unit rotating one turn along the second rotating axis, a rotation range of the driven part along the first rotating axis is less than one turn to fine-tune an optical axis of the image capturing module, and wherein the housing has a mounting surface and the second rotating axis is tilted on the mounting surface.

2. The image capturing device according to claim 1, wherein the first rotating axis is perpendicular to the second rotating axis.

3. The image capturing device according to claim 1, wherein the first rotating axis is perpendicular to an optical axis of the image capturing module.

4. The image capturing device according to claim 1, wherein the image capturing device is adapted to be installed on a windshield of a vehicle by the mounting surface.

5. The image capturing device according to claim 1, wherein the image capturing module faces the front of the image capturing device, the angle-adjusting unit has a force-receiving part facing the rear of the image capturing device, and the force-receiving part is adapted to receive force to rotate the angle-adjusting unit along the second rotating axis.

6. The image capturing device according to claim 5, wherein the force-receiving part comprises a non-circular hole.

7. The image capturing device according to claim 5, wherein the angle-adjusting unit further has a flight portion and an extension part, the flight portion is engaged to the driven part, and the extension part is connected between the flight portion and the force-receiving part.

8. The image capturing device according to claim 7, wherein the angle-adjusting unit further has at least one structural reinforcing rib, and the at least one structural reinforcing rib is connected to the extension part.

9. The image capturing device according to claim 1, wherein the image capturing module comprises a lens and a base, the lens is disposed on the base, the base has a driven part mounting part, and the driven part is connected to the driven part mounting part.

10. The image capturing device according to claim 9, wherein the housing comprises a first housing part and a second housing part, and the base is rotatably disposed between the first housing part and the second housing part.

11. The image capturing device according to claim 1, further comprising a decoration cover, wherein the decoration cover is connected to the image capturing module, thereby rotating along with the image capturing module, the decoration cover has a direction indicating mark, and the direction indicating mark is configured to indicate a direction of an optical axis of the image capturing module.

12. The image capturing device according to claim 1, wherein the housing has at least one stopper, the driven part has at least another stopper, and the at least one stopper and the at least another stopper are adapted to stop each other to limit the a rotation angle range of the image capturing module relative to the housing.

* * * * *